United States Patent
Beuschel et al.

(10) Patent No.: US 7,119,888 B2
(45) Date of Patent: Oct. 10, 2006

(54) METHOD FOR DETERMINING THE RELATIVE SPEED OF AN OBJECT

(75) Inventors: Michael Beuschel, Koesching (DE); Alexander Nastasie, Ingolstadt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 218 days.

(21) Appl. No.: 10/509,437

(22) PCT Filed: Feb. 21, 2003

(86) PCT No.: PCT/DE03/00543

§ 371 (c)(1),
(2), (4) Date: Sep. 23, 2004

(87) PCT Pub. No.: WO03/083511

PCT Pub. Date: Oct. 9, 2003

(65) Prior Publication Data

US 2005/0151958 A1    Jul. 14, 2005

(30) Foreign Application Priority Data

Mar. 28, 2002    (DE) ................... 102 13 901

(51) Int. Cl.
*G01P 3/26* (2006.01)
*G01C 3/08* (2006.01)

(52) U.S. Cl. .................. 356/28; 356/4.01; 356/5.01

(58) Field of Classification Search ............. 356/4.01, 356/5.01, 5.05–5.08, 28; 342/70–72, 104, 342/109

See application file for complete search history.

(56) References Cited

U.S. PATENT DOCUMENTS

| | | | | |
|---|---|---|---|---|
| 4,948,246 A | * | 8/1990 | Shigematsu | 356/5.08 |
| 5,359,404 A | | 10/1994 | Dunne | |
| 5,471,215 A | | 11/1995 | Fukuhara et al. | |
| 5,521,696 A | * | 5/1996 | Dunne | 356/5.07 |
| 5,621,514 A | | 4/1997 | Paranto et al. | |
| 6,012,008 A | * | 1/2000 | Scully | 701/45 |
| 2005/0213075 A1 | * | 9/2005 | Cook | 356/28 |

FOREIGN PATENT DOCUMENTS

| | | |
|---|---|---|
| DE | 4115747 | 11/1992 |
| DE | 19963005 | 6/2001 |

* cited by examiner

*Primary Examiner*—Thomas H. Tarcza
*Assistant Examiner*—Isam Alsomiri
(74) *Attorney, Agent, or Firm*—W. F. Fasse; W. G. Fasse

(57) ABSTRACT

Methods for the measurement of the object spacing distance or separation of objects are increasingly utilized in obstacle warning systems for motor vehicles, in order to warn the drivers of the motor vehicles of sources of danger on the roadway. It would be sensible or suitable in such a system, to take into account also the relative speed of objects approaching the motor vehicle. The new method shall enable the determination of the relative speed of an object in a simple manner and provide exact measurement results. In the new measurement method, the object separation is cyclically determined respectively after expiration of a prescribed cycle period. Furthermore, the number of the cycles is determined, within which the object separation changes so far that a prescribed separation band is completely traversed. The relative speed of the object is then calculated from the difference between the object separation determined before the entry into the separation band and the object separation determined after the exit out of the separation band, and from the determined number of cycles. Pre-crash sensing.

11 Claims, 5 Drawing Sheets

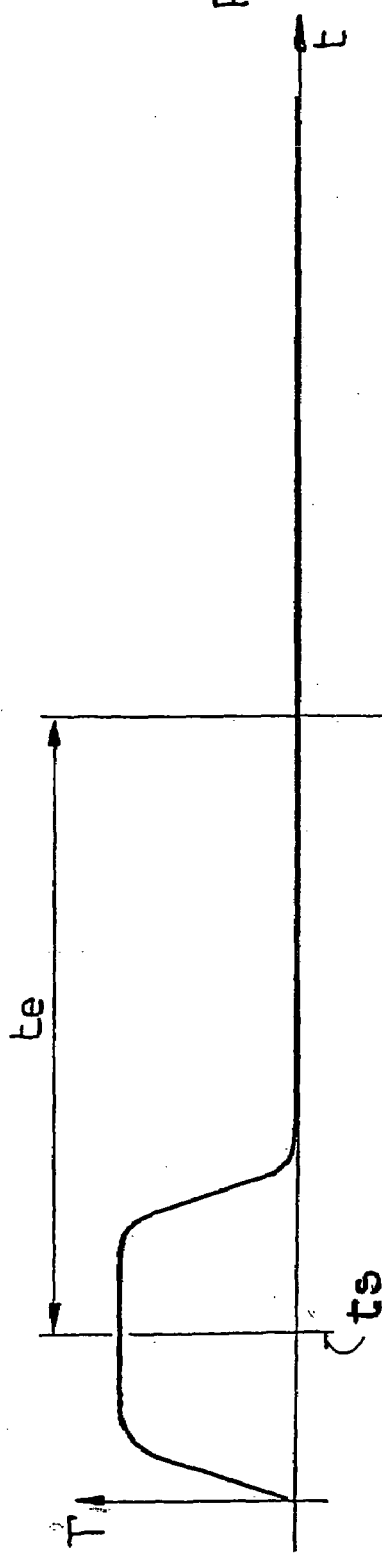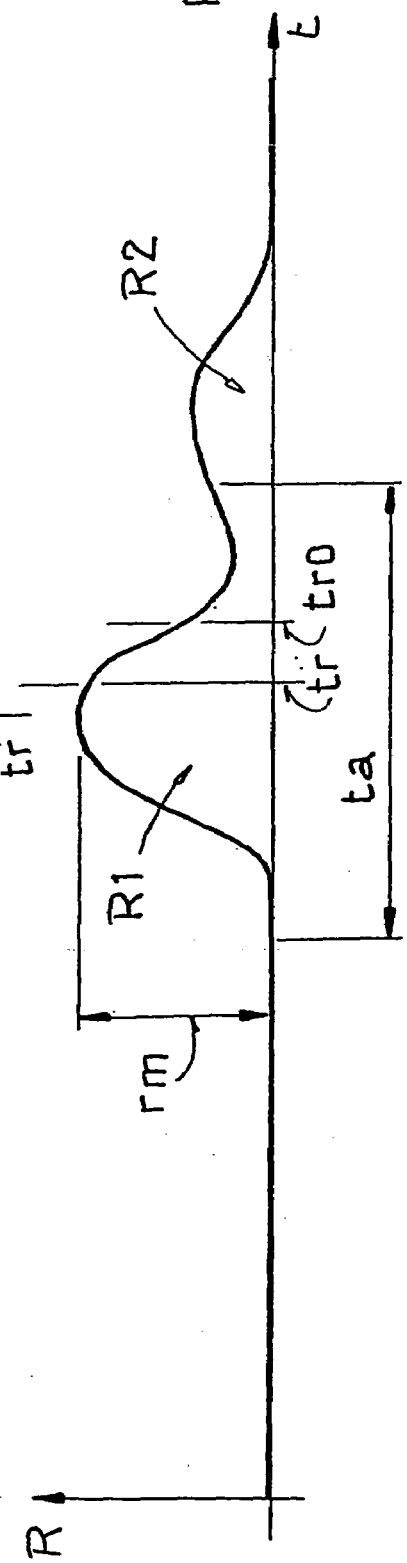

METHOD FOR DETERMINING THE RELATIVE SPEED OF AN OBJECT

BACKGROUND OF THE INVENTION

The invention relates to a method for the measurement of the relative speed of an object according to patent claim 1.

Methods for the determination of object separations or spacing distances are increasingly utilized in obstacle warning systems for motor vehicles, in order to warn the drivers of the motor vehicles of sources of danger on the roadway. For example, a method for the obstacle recognition is known from the DE 41 15 747 C2, in which an observation or monitoring space in front of a vehicle is repeatedly sensed or sampled with a laser source, in order to calculate the object separation or spacing distance from the signal transit time of the light emitted from the laser source and reflected on an object, and to warn the driver, through acoustic or optical signals, of a possible collision with the object, depending on the determined object separation.

It would be sensible or suitable in the estimation of the collision probability, to determine also the speed of the objects approaching the vehicle. While this could be determined through a differentiation of the time course or progression of the object separation, the result, however, would be inexact due to the noise increased or amplified through the differentiation. While the signal-to-noise ratio of the measurement result could be suppressed through a filtering, the filtering would, however, lead to an undesired time delay in the providing of the measurement result. Furthermore, it would be conceivable to improve the signal-to-noise ratio through increasing of the radiation power of the laser source, but an increasing of the radiation power is not desired, because this could lead to an eye injury of persons or animals that might look in the direction of the laser source.

Therefore, it is an underlying object of the invention to present a method for the determination of the relative speed of an object, that can be carried out with a low effort or expense, and provides exact measurement results.

BRIEF SUMMARY OF THE INVENTION

The object is achieved through the characterizing features of the patent claim 1. Advantageous embodiments and further developments arise from the dependent claims.

According to the invention, the object separation or spacing distance of an object relative to a reference location is determined repeatedly in successive cycles respectively after expiration of a prescribed cycle period. Moreover, the number of the cycles is determined, within which the object separation decreases so much or increases so much that a prescribed separation band is completely traversed. That is to say, in connection with the determination of the speed of an object approaching the reference location, the cycles are counted, within which cycles the object separation diminishes or is reduced from an upper object separation value lying above an upper separation threshold value to a lower object separation value lying below a lower separation threshold value. On the other hand, in connection with the determination of the speed of an object moving farther from the reference location, the cycles are counted, within which cycles the object separation increases from a lower object separation value lying below a lower separation threshold value to an upper object separation value lying above an upper separation threshold value. Then, the relative speed of the object is calculated from the difference between the object separation determined before the entry into the separation band and the object separation determined after the exit out of the separation band, that is to say from the difference between the upper and lower object separation value, and from the determined number of the cycles.

Preferably, before the calculation of the speed, a plausibility test is carried out, in which it is tested whether the object separation determined in a cycle differs from the object separation determined in a preceding cycle by more than a prescribed threshold value. If this is the case in a certain number of successive cycles, then the determined object separation values are considered as not plausible, and the speed measurement is interrupted and started anew.

In an advantageous embodiment of the inventive method, the object separation is determined through the measurement of the pulse transit time of a light pulse emitted from the reference location into a measurement space and reflected back from the measurement space to the reference location.

In this regard, the reception time point of the back-reflected light pulse, which determines the pulse transit time, is determined preferably in that the back-reflected light pulse is detected for the generation of a reception signal, and the time point is determined, which corresponds to the center of gravity or major point of the reception signal.

For this purpose, the reception signal is preferably evaluated only in a limited time range. In that regard, the time range is selected in such a manner that the maximum of the reception signal lies in this time range, for example in the middle thereof.

Preferably, the reception time point of the back-reflected light pulse is determined only when the maximum of the reception signal lies above a prescribed noise level.

Moreover, a noise compensation is advantageously carried out, in that the reception signal is reduced by a prescribed noise portion or component, and/or a temperature compensation is carried out in order to compensate temperature dependent noise or interference components out of the pulse transit time.

Preferably, light pulses are emitted into different spatial segments or sections of the measurement space respectively representing a channel, and the back-reflected light pulses are evaluated in a channel-referenced manner. Thereby it is possible to obtain, in addition to the determined relative speed values, also a location information about the objects located in the measurement space via the allocation of the determined relative speed values respectively to one of the channels.

The inventive method is best suited for the use in an occupant restraint system for motor vehicles. In such an application, the inventive method serves for the pre-crash sensing, that is to say the recognition of the danger of an imminent collision of the motor vehicle with an object approaching the motor vehicle. If such a danger is recognized, then triggering criteria for restraint means, for example for an airbag, can be suitably adapted to a possible accident scenario. This leads to a more-targeted triggering of the restraint means and thus an increase of the intended protective effect for the vehicle occupants.

The calculation of the speed on the basis of the time within which the object separation diminishes or is reduced so far that the separation band defined by the separation threshold values is completely traversed, has been found to be especially advantageous in this regard, because the separation band is definable in such a manner so that only light pulses that are reflected in the close range that is important for the pre-crash sensing will be evaluated. Thus, the speed of an object is measured at the correct time point, that is to say when the object could represent a danger for the motor vehicle with high probability. Moreover, the light pulses reflected in the close range comprise a higher amplitude and therewith a more-advantageous signal-to-noise ratio than the light pulses reflected in the far range. As a result of this, also the evaluation of the light pulses reflected in the close range lead to more-exact object separation values and therewith also to more-exact speed values than the evaluation of the light pulses reflected in the far range.

BRIEF DESCRIPTION OF THE DRAWINGS

In the following, the invention will be described in further detail in connection with an example embodiment and in connection with figures, wherein:

FIGS. 1a–1c show pulse diagrams of an emission signal and a reception signal,

DETAILED DESCRIPTION OF THE INVENTION

Figure 2:
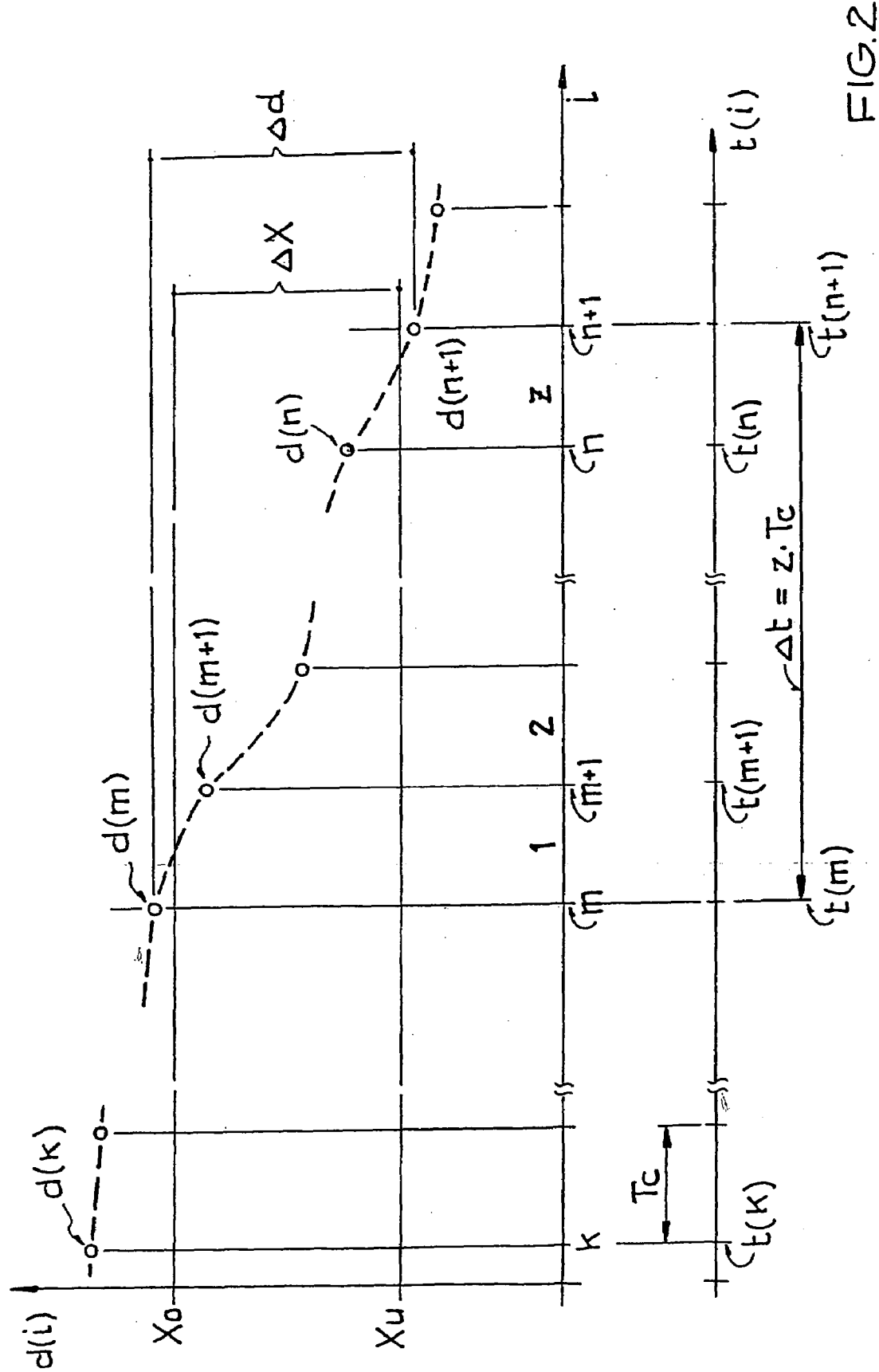
FIG. 2 shows an example for the time course or progression of object separation values of an object approaching the reference location.

The inventive method is utilized in an occupant restraint system for motor vehicles for the pre-crash sensing. In that context, the likelihood or probability of an imminent collision is estimated through detection of objects that are located within a measurement space in front of the motor vehicle, and through determination of the speed of objects that, if applicable, approach the motor vehicle. The objects are detected through emitting of light pulses and detection of the light pulses reflected back from the objects, whereby the light pulses are advantageously emitted sequentially into various different spatial sections or segments of the measurement space respectively representing a channel and are detected in a channel-referenced manner, in order to obtain, in addition to the separation or spacing distance information, also an information about the location range of the object reflecting the respective light pulse. Then, the object separations or spacing distances are determined from the echo times, that is to say from the pulse transit times of the emitted and reflected light pulses, and the speeds of the objects are determined from the time change of the object separations.

The measurement of the pulse transit time of a light pulse is described in further detail in the following in connection with the FIGS. 1a to 1c.

The FIG. 1a shows the time course or progression of a pulse-shaped emission signal T, which is delivered to a radiation source located on the motor vehicle—the reference location. The emission time point ts is prescribed by a control unit and is thus known. In reply or response to the emission signal T, the radiation source emits a light pulse, for example in the form of a collimated or bundled or a diverging infrared laser beam. If this light pulse impinges on an object, then it is partially reflected back to the motor vehicle and there is detected by a detector arrangement.

FIG. 1b shows a reception signal R, that is generated by the detector arrangement comprising a photodetector, through detection of the back-reflected light pulse. In that regard, the detection can also comprise signal processing steps, especially an amplification, a band limiting, and interference or stray light compensation.

The reception signal R comprises a pulse R1, of which the center or middle marks the reception time point tr of the reflected light pulse.

The time spacing between the emission time point ts and the reception time point tr represents the pulse transit time te that is to be measured. Thus, for the determination of the pulse transit time te, the reception time point tr is to be determined. By definition, this is equal to the particular time point, in which lies the center of gravity or major point of the reception signal R, i.e. thus at the center of gravity of the pulse R1. This time point tr corresponding to the center of gravity or major point of the reception signal R can be calculated according to the following equation:

$$tr = \frac{\int t \cdot R dt}{\int R dt},$$

whereby R represents the reception signal R and t represents the time. In that regard, the integration is to be carried out over the entire pulse R1.

The reception signal R can also comprise further pulses of smaller amplitude, that arise at later time points and that result from reflections of the light pulse on more-distant and thus less-relevant objects.

FIG. 1c shows such a further pulse R2, which can falsify the measurement, if the entire reception signal R is used as the basis for the determination of the reception time point. Then, instead of the time point tr shown in FIG. 1b, one would obtain the time point tr0 sharply deviating from this time point tr as the reception time point. In order to keep this error small, the maximum rm of the reception signal R is determined, a limited time range ta lying around the maximum rm is selected, and only the portion of the reception signal R lying in this time range ta is used as a basis of the determination of the reception time point tr. That is to say, in the determination of the time point tr according to the above mentioned equation, the integration is carried out only over the time range ta. Thereby, one obtains reception time points tr that only slightly deviate from one another for the two courses or progressions of the reception signal R illustrated in the FIGS. 1b and 1c.

The pulse transmit time te is a measure of the spacing distance or separation to the object reflecting the light pulse. From it, the object separation or spacing distance d can be calculated according to the equation d=c·te/2, wherein c represents the speed of light. Through cyclical repetition of the measurement, one then obtains a series of object separation values, which represent the motion course or progression of the object relative to the motor vehicle. It is conceivable, to emit several light pulses during a cycle, to generate an averaged reception signal from the resulting reception signals by means of averaging, and to determine the reception time point tr from this averaged reception signal. Thereby, the signal-to-noise ratio of the measurement result is improved.

FIG. 2 shows an exemplary course or progression of object separation values d(i) of an object approaching the vehicle. These object separation values d(i) are respectively determined after expiration of a cycle, that is to say at time points t(i). The time points t(i) are respectively separated or spaced from one another by a prescribed cycle period Tc. The index i represents a transit or running index. The figure additionally shows a spacing distance or separation band ΔX, that lies in the close range of the motor vehicle relevant for the pre-crash recognition, and that is limited or bounded by an upper separation threshold value Xo and a lower separation threshold value Xu. Of the illustrated object separation values d(i), the values d(k) to d(m) lie above the separation band ΔX, the values d(m+1) to d(n) lie within the separation band ΔX, and the remaining values lie below the separation band ΔX.

The determination of the relative speed v of the object is based on the identification of two object separation values d(i), in fact on the identification of the last object separation value d(i) before the entry into the separation band ΔX, thus in the present case the object separation value d(m), and the first object separation value d(i) determined after the complete traversal of the separation band ΔX, thus in the present case the object separation value d(n+1), as well as on the counting of the cycles that respectively last or have a time duration of one cycle period Tc, within which the object separation d(i) diminishes or is reduced from the one identified object separation value d(m) to the other identified object separation value d(n+1) that is smaller by a difference Δd. The product of the number z of the counted cycles and the cycle period Tc represents the time Δt, within which the object separation d(i) is reduced by the difference Δd. The relative speed v sought after can thus be calculated according to the equation v=Δd/Δt with Δd=d(m)−d(n+1) and Δt=z·Tc.

Figure 3A:
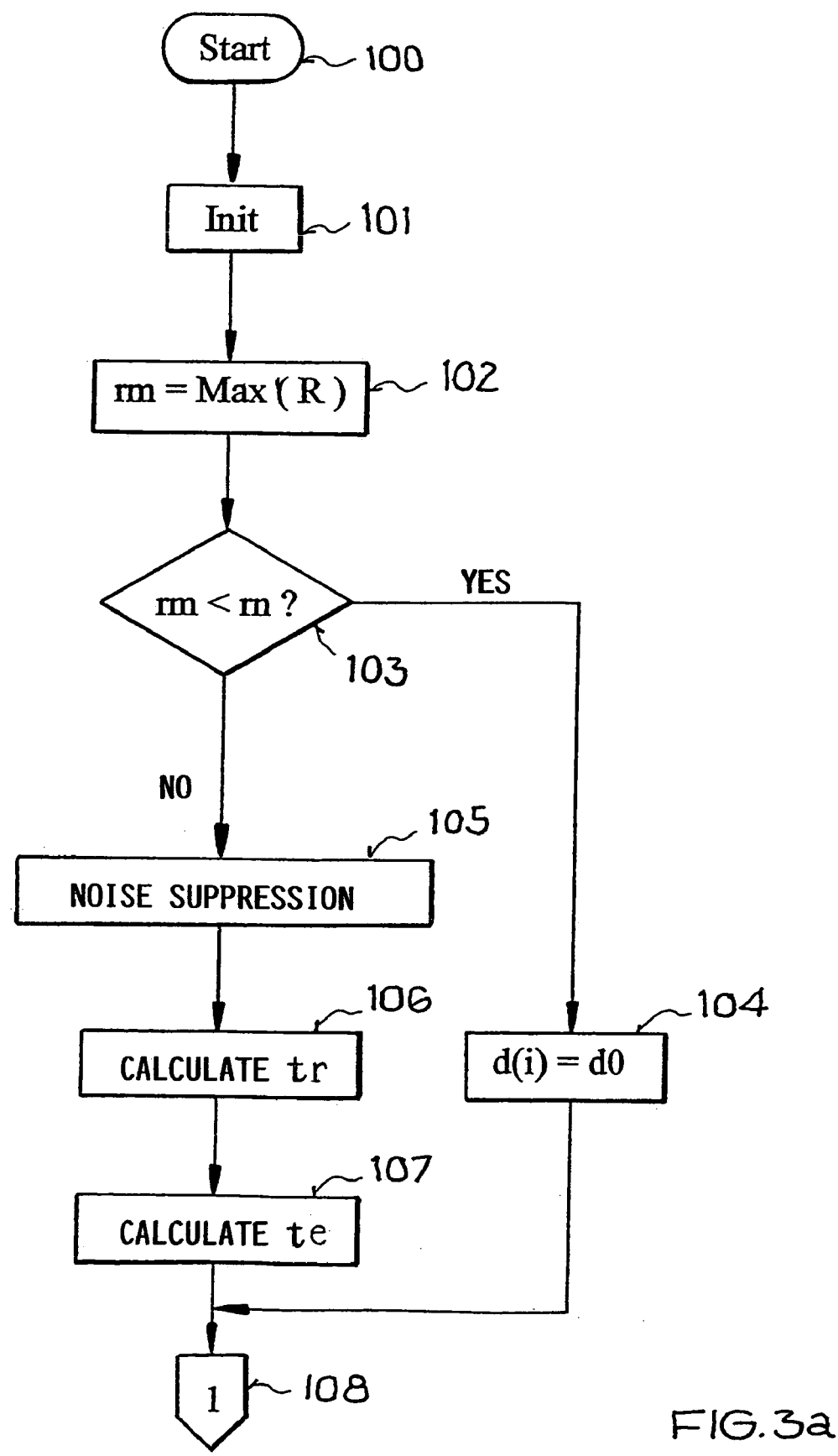
FIGS. 3a–3c show a flow diagram for the determination of the speed of the object.

The algorithm for the determination of the relative speed v is explained in further detail in the following in connection with the flow diagram shown in the FIGS. 3a to 3c. In that regard, FIG. 3a shows the method steps for the determination of an object separation value d(i). It is self-understood that the course or progression of the reception signal R in this regard is represented by a row or series of digital sampled values. In this regard, one obtains the sampled values as the result of a sampling of the reception signal R with subsequent analog-digital conversion.

The algorithm is a sub-program or sub-routine that is called up by an operating program after the detection of the reception signal R. According to FIG. 3a, the call-up occurs in the step 100. Then, data are initialized in the following step 101, especially the sampled values representing the reception signal R are read into corresponding variables. Then the maximum rm of the reception signal R is determined in the next step 102. Next, in the step 103, it is tested whether the maximum rm is smaller than a prescribed noise level rn. If this applies then the method branches off to step 104, otherwise to step 105. In the step 104, the current object separation value d(i) is set to a separation default or prescribed value d0. In the step 105, a noise suppression is carried out, in that the sampled values representing the reception signal R are respectively reduced by a noise portion or component determined by the noise level rn. In the following step 106, the reception time point tr is calculated in the manner described in connection with the FIG. 1c. That is to say, the time point is calculated that corresponds to the center of gravity or major point of a selected section of the reception signal R, whereby the section is selected in such a manner so that the maximum rm lies in the middle thereof. Then, in the following step 107, the pulse transit time te is calculated as the difference between the reception time point tr and the known emission time point ts. Moreover, it is conceivable in this context, also to compensate a possibly existing temperature dependence of the transmission or emission time point ts if applicable. As a precondition for this, the influence of temperature variations on the transmission or emission time point ts must be known, and the temperature of the radiation source emitting the light pulse must be detected. In the following steps, the pulse transit time is treated, directly or after a scaling with a proportionality factor, as the object separation d(i) determined in a cycle.

Figure 3B:
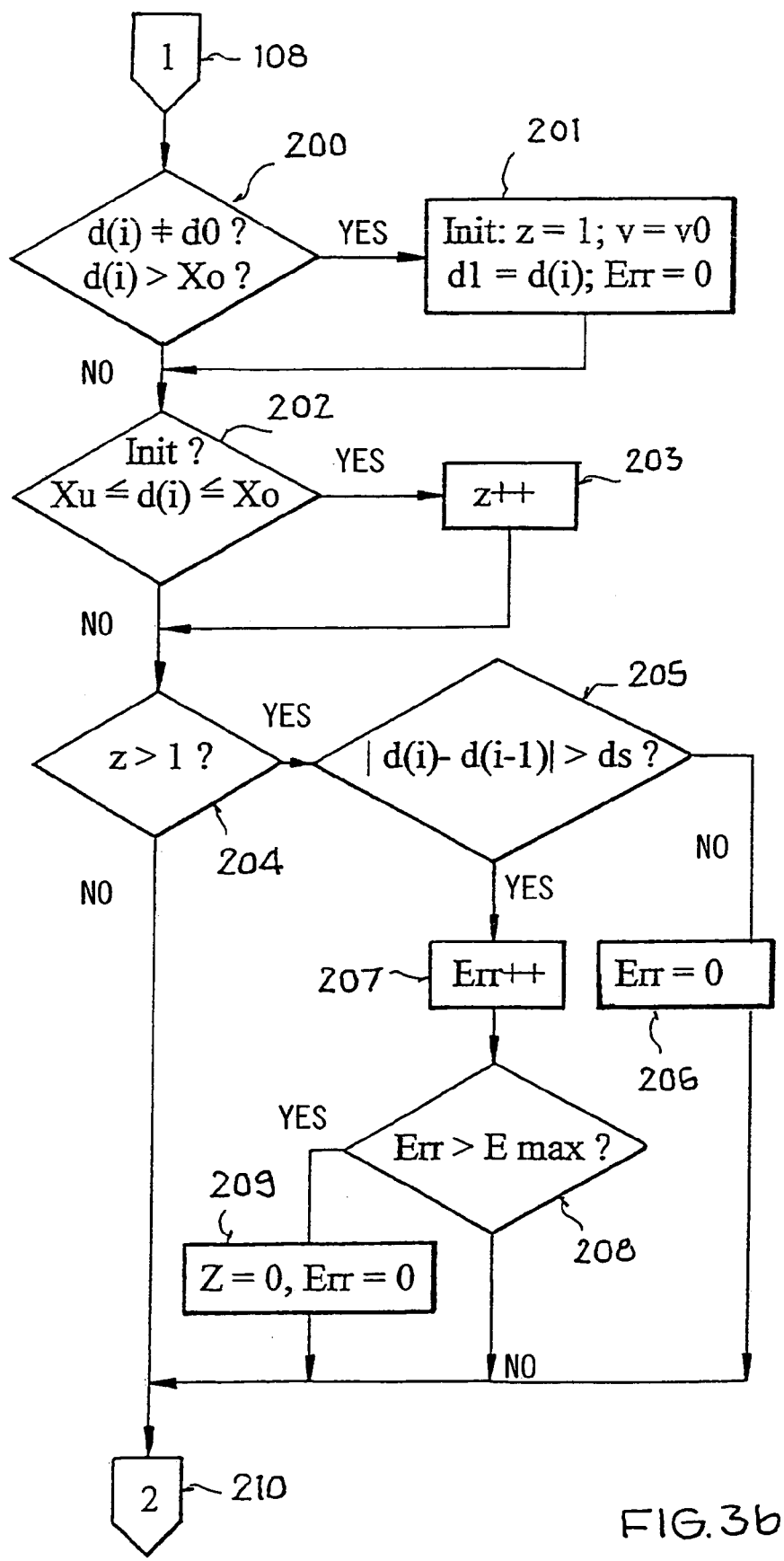
Figure 3C:
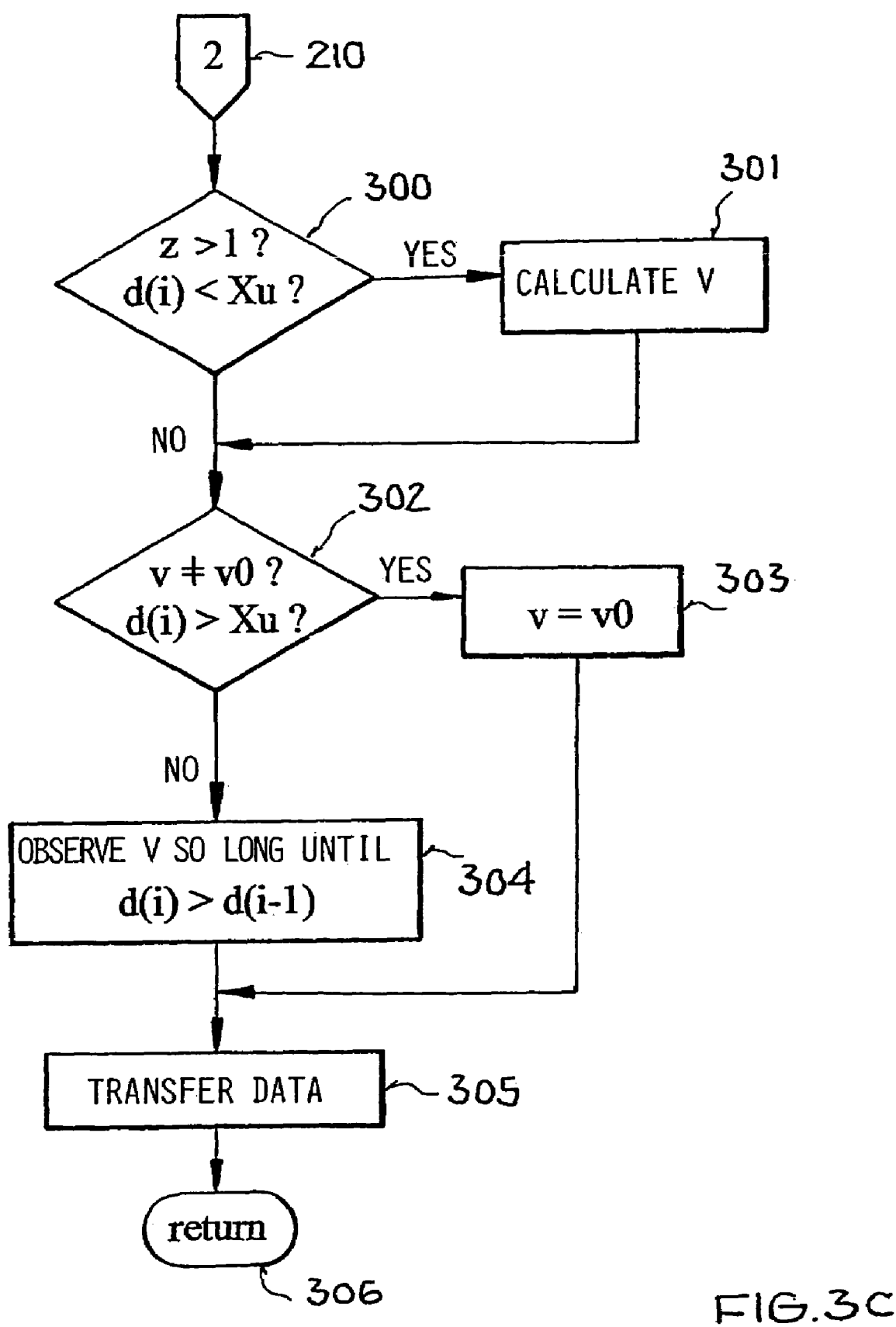

According to FIG. 3b, the step 200 follows the steps 107 and 104 via the junction or connection location 108. In the step 200, it is tested whether the current object separation value d(i) is a valid value, that is to say whether it is not equal to the separation default value d0, and whether the current object separation value d(i) is greater than the upper separation threshold value Xo. If these conditions are fulfilled, the method branches via step 201 to step 202, and otherwise directly to step 202. In the step 201, an initialization is carried out, and in fact a cycle counter z is set to the value 1, the speed v is set to a speed default or prescribed value v0, an error counter Err is set to the value 0, and the current object separation value d(i) is intermediately stored as the indicator or key value d(1). In the step 202 it is tested whether an initialization according to step 201 has already been carried out since the beginning of the measurement, and whether the current object separation value d(i) lies between the separation threshold values Xo and Xu, that is to say within the separation band ΔX. If these conditions apply, then the method branches via step 203 to step 204, otherwise directly to step 204. In the step 203, the cycle counter z is incremented by 1. Then, in the step 204, it is tested whether the cycle counter z is greater than 1. If this applies, that is to say if a valid object separation value lying above the upper separation threshold value Xo and thereafter an object separation value lying within the separation band ΔX has already been determined since the beginning of the measurement, then the method branches to step 205, otherwise via the junction or connection location 210 to step 300. In step 205, it is tested whether the current object separation value d(i) differs from the previous object separation value d(i−1), with respect to the magnitude or absolute value thereof, by more than a prescribed threshold value ds. If this applies, then the method branches to step 207, otherwise via step 206 to the junction or connection location 210. In the step 206, the error counter Err is set to 0, while on the other hand in the step 207 it is incremented by 1. After step 207, in step 208 it is tested whether the error counter Err is greater than a prescribed value Emax. If this condition is fulfilled, which is the case when a number corresponding to the value Emax of successive object separation values differ from the respective preceding object separation value with respect to the magnitude or absolute value thereof by more than the threshold value ds, then the method branches via step 209 to the junction or connection location 210, otherwise directly to the junction or connection location 210. In the step 209, the cycle counter z and the error counter Err are set to 0, which corresponds to the ending or termination of the present measurement and the beginning of a new measurement.

According to FIG. 3c, following the junction or connection location 210, there is the step 300, in which it is tested whether the cycle counter z is greater than 1, and whether the current object separation value d(i) lies below the lower separation threshold value Xu. If these conditions apply, then the method branches via step 301 to step 302, otherwise directly to step 302. In step 301, the speed v is calculated in the manner described in connection with FIG. 2, that is to say the value v=K·(d1−d(i))/z is calculated, whereby K is a scaling factor, d1 represents the object separation intermediately stored as the indicator or key value in step 201, d(i) represents the current object separation value, and z represents the current state of the cycle counter z. In that regard, the current state of the cycle counter is equal to the number of the cycles, within which the object separation has diminished or been reduced from the indicator or key value d1 to the current object separation value d(i). In step 302 it is tested whether the speed v has already been calculated according to step 301, which is the case when the speed value v is not equal to the speed default value v0, and it is further tested whether the current object separation value d(i) is greater than the lower separation threshold value Xu. If these conditions are fulfilled, then the method branches via step 303 and otherwise via step 304 to step 305. In step 303, the speed value v is set to the speed default value v0. In step 304, the calculated speed value v is observed or noticed unchangeably so long until the object separation again increases. It is the purpose of this step to prevent the speed value v, which has already been determined, from being updated directly after a collision of the vehicle with the object approaching it, because a speed value determined after the collision could be erroneous, and the triggering criteria for the restraint means could be erroneously set in connection with the evaluation of erroneous speed values. In the following step 305, the determined object separation and speed values are transferred to an airbag control device, which estimates the danger of an imminent collision on the basis of the transferred values, and sets the triggering criteria of the restraint means dependent on the estimated collision danger. Then, with the next step 306, the current measurement is ended, and the method jumps back to the operating program.

In the present example embodiment, the measurement of the object separation or spacing distance is based on the determination of the pulse transit time of a light pulse emitted to the object and reflected on the object. It is readily apparent that the object separation values can also be determined through evaluation of the pulse transit time of other types of radiation, for example through evaluation of the transit time of radar pulses or ultrasonic pulses.

The invention claimed is:

1. Method for the measurement of the relative speed (v) of an object, in which the object separation (d(i)) of the object is determined cyclically respectively after expiration of a prescribed cycle period (Tc) and the number (z) of the cycles is determined, within which the object separation (d(i)) is changed so far that a prescribed separation band (ΔX) is completely traversed, and in which the relative speed (v) of the object is calculated from the difference (Δd) between the object separation (d(m)) determined before the entry into the separation band (ΔX) and the object separation (d(n+1) determined after the exit out of the separation band (ΔX) and from the determined number (z) of the cycles.

2. Method according to claim 1, characterized in that the measurement of the relative speed is ended and started anew, if, in a certain number (Emax) of successive cycles, separation values are determined as object separation (d(n+1(i)), that differ from the respective preceding separation value by more than a prescribed threshold value (ds).

3. Method according to claim 1, characterized in that a determined speed value (v) is observed unchangeably so long until the object separation (d(i)) determined in a cycle increases relative to the object separation determined in the preceding cycle.

4. Method according to claim 1, characterized in that the object separation (d(i)) determined in a cycle is determined through measurement of a pulse transit time (te) of a light pulse emitted into a measurement space and reflected back out of the measurement space.

5. Method according to claim 4, characterized in that, for the measurement of the pulse transit time (te) of the emitted and back-reflected light pulse, a reception time point (tr) is determined as time point of the reception of the back-reflected light pulse, in that the back-reflected light pulse is detected for the generation of a reception signal (R), and a time point (tr) corresponding to the center of gravity point of the reception signal (R) is determined as reception time point (tr) of the o back-reflected light pulse.

6. Method according to claim 5, characterized in that the maximum (rm) of the reception signal (R) is determined, and in that only a time range (ta) of the reception signal (R) lying about the maximum (rm) is used as a basis for the determination of the reception time point (tr) of the back-reflected light pulse.

7. Method according to claim 6, characterized in that the reception time point (tr) of the back-reflected light pulse is determined only when the maximum (rm) of the reception signal (R) lies above a prescribed noise level (rn).

8. Method according to claim 7, characterized in that the reception signal (R) or the time range (ta) of the reception signal (R) used as a basis for the determination of the reception time point (tr) is reduced by a prescribed noise portion before the determination of the reception time point (tr).

9. Method according to claim 4, characterized in that a temperature compensation is carried out for the reduction of temperature dependent interference components out of the pulse transit time (te).

10. Method according to claim 4, characterized in that light pulses are emitted into various different spatial sections of the measurement space respectively representing a channel, and in that the back-reflected light pulses are evaluated in a channel-referenced manner.

11. Method according to claim 1, further comprising recognizing an imminent collision of a vehicle with an object approaching the vehicle.

* * * * *

UNITED STATES PATENT AND TRADEMARK OFFICE
CERTIFICATE OF CORRECTION

| | | |
|---|---|---|
| PATENT NO. | : 7,119,888 B2 | Page 1 of 1 |
| APPLICATION NO. | : 10/509437 | |
| DATED | : October 10, 2006 | |
| INVENTOR(S) | : Beuschel et al. | |

It is certified that error appears in the above-identified patent and that said Letters Patent is hereby corrected as shown below:

<u>Title page,</u>
Item [56], References Cited, U.S. PATENT DOCUMENTS,
Line 7, after "9/2005", replace "Cook" by --Cooke--;

<u>Column 6,</u>
Line 8, after "value", replace "do" by --d0--;

<u>Column 8,</u>
Line 1, after "separation", replace "(d(n+1(i))" by --(d(i))--;
Line 22, after "the", delete --o--.

Signed and Sealed this

Eighth Day of May, 2007

JON W. DUDAS
*Director of the United States Patent and Trademark Office*